(12) United States Patent
Wong

(10) Patent No.: US 7,976,772 B2
(45) Date of Patent: Jul. 12, 2011

(54) FILTER

(76) Inventor: Ching-Piao Wong, Yonghe (TW)

( * ) Notice: Subject to any disclaimer, the term of this patent is extended or adjusted under 35 U.S.C. 154(b) by 622 days.

(21) Appl. No.: 12/132,105

(22) Filed: Jun. 3, 2008

(65) Prior Publication Data

US 2009/0295049 A1    Dec. 3, 2009

(51) Int. Cl.
*B01D 33/01* (2006.01)
*B01D 33/052* (2006.01)
*C21C 1/04* (2006.01)

(52) U.S. Cl. ........ 266/205; 266/227; 266/229; 266/230; 266/231; 266/238; 210/364; 210/365; 210/367; 210/388; 210/389

(58) Field of Classification Search .................. 266/205, 266/227–232, 238; 210/364–365, 367, 388–389
See application file for complete search history.

(56) References Cited

U.S. PATENT DOCUMENTS

| 4,995,972 A | * | 2/1991 | Kramer et al. ................. 210/179 |
| 5,755,889 A | * | 5/1998 | Johnson .......................... 75/414 |
| 2006/0199125 A1 | | 9/2006 | Evans |
| 2007/0272058 A1 | | 11/2007 | Orth et al. |

FOREIGN PATENT DOCUMENTS

| JP | 09-220413 | * 8/1997 |
| TW | 176994 | 1/1992 |

* cited by examiner

*Primary Examiner* — Roy King
*Assistant Examiner* — Lois Zheng
(74) *Attorney, Agent, or Firm* — Alan Kamrath; Kamrath & Associates PA

(57) ABSTRACT

A filter includes a crucible, a filtering container, and a receiving tank. The crucible has a heater for heating a pre-filtered object to comprise a primary material in liquid and at least one other material in solid. The filtering container has a body, a sieve, and a press rod. The body connects with the crucible for receiving the heated pre-filtered object in a channel and provides a guide-out member; the sieve is disposed in said channel; and the press rod movably received in the channel for pressing the primary material of the pre-filtered object to flow through the sieve and to the guide-out member. The receiving tank has an entrance facing the guide-out member of the filtering container to receive the filtered primary material.

8 Claims, 4 Drawing Sheets

FILTER

BACKGROUND OF THE INVENTION

1. Field of the Invention

The present invention relates to a filter and, more particularly, to a filter for separating substances with different melting points.

2. Description of the Related Art

Conventionally, for reclamation and recycling of zinc, discarded materials of zinc with impurities that have melting points higher than that of zinc are melted in a heated crucible to separate liquid zinc and solid impurities. Moreover, said discarded materials have to be heated to a temperature higher than the melting point of zinc but lower than those of the impurities in order to obtain the liquid zinc and solid impurities. However, workers for stirring the melted materials to speed up the melting rate and for scooping the solid impurities out are required, and who will easily inhale a mass of pernicious gas produced while the discarded materials are melted. Besides, what are scooped out may not only be the solid impurities but also some liquid zinc attaching on the solid impurities, and this will greatly lower the recycling efficiency of zinc.

A Taiwan utility patent with Publication No. 176994 discloses a continuous-vibrating filter for reclamation and recycling of zinc. The continuous-vibrating filter comprises a furnace and a filtering plate passing through the furnace and providing a plurality of through holes, with the filtering plate being inclined and connecting to a vibrator at a higher end thereof. When the continuous-vibrating filter is used to reclamation, the furnace also provides a temperature higher than the melting point of zinc but lower than those of the impurities and the discarded materials are placed at the higher end in advance. And then the discarded materials slowly slide to a lower end of the filtering plate with the vibrator being actuated to shake the filtering plate while the discarded materials slide along the filtering plate and pass through the furnace, zinc within said discarded materials will then be melted and goes through the through holes of the filtering plate to be collected in a container. In the meanwhile, solid impurities in said discarded materials are finally piled up at the lower end of the filtering plate.

Nevertheless, there are still some disadvantages of the continuous-vibrating filter. First, the liquid zinc flows through the through holes of the filtering plate owing to weight itself, which is thus collected slowly. Second, because of the way by which the liquid zinc is collected, there is still a great amount of zinc attached to the solid impurities or the filtering plate, and output of zinc will thus be low still. Accordingly, there is a need for redesigning the conventional filter.

SUMMARY OF THE INVENTION

The primary objective of this invention is to provide a filter including a crucible having a heater for heating a pre-filtered object to comprise a primary material in liquid and at least one other material in solid, a filtering container receiving the heated pre-filtered object and pressing the primary material to flow through a sieve, and a receiving tank receiving the filtered primary material. Accordingly, a purpose to separate materials with different melting points is achieved.

The secondary objective of this invention is to provide the filter with an outlet valve for said at least one other material to be pushed out of the filtering container, a collecting tank for collecting the at least one other material, and a mold case for the primary material to solidify and form in a predetermined shape. Accordingly, a filtering process is performed by the present invention automatically and conveniently.

The filter in accordance with an aspect of the present invention includes a crucible, a filtering container, and a receiving tank. The crucible has a heater for heating a pre-filtered object to comprise a primary material in liquid and at least one other material in solid. The filtering container has a body, a sieve, and a press rod. The body connects with the crucible for receiving the heated pre-filtered object in a channel and provides a guide-out member; the sieve is disposed in said channel; and the press rod movably received in the channel for pressing the primary material of the pre-filtered object to flow through the sieve and to the guide-out member. The receiving tank has an entrance facing the guide-out member of the filtering container to receive the filtered primary material.

In a separate aspect of the present invention, the sieve forms an end of the press rod and the press rod has a passageway connecting with the sieve and linking to the guide-out member.

Further scope of the applicability of the present invention will become apparent from the detailed description given hereinafter in connection with drawings. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter, and the accompanying drawings that are given by way of illustration only are not limitations of the present invention, wherein.

Figure 1:
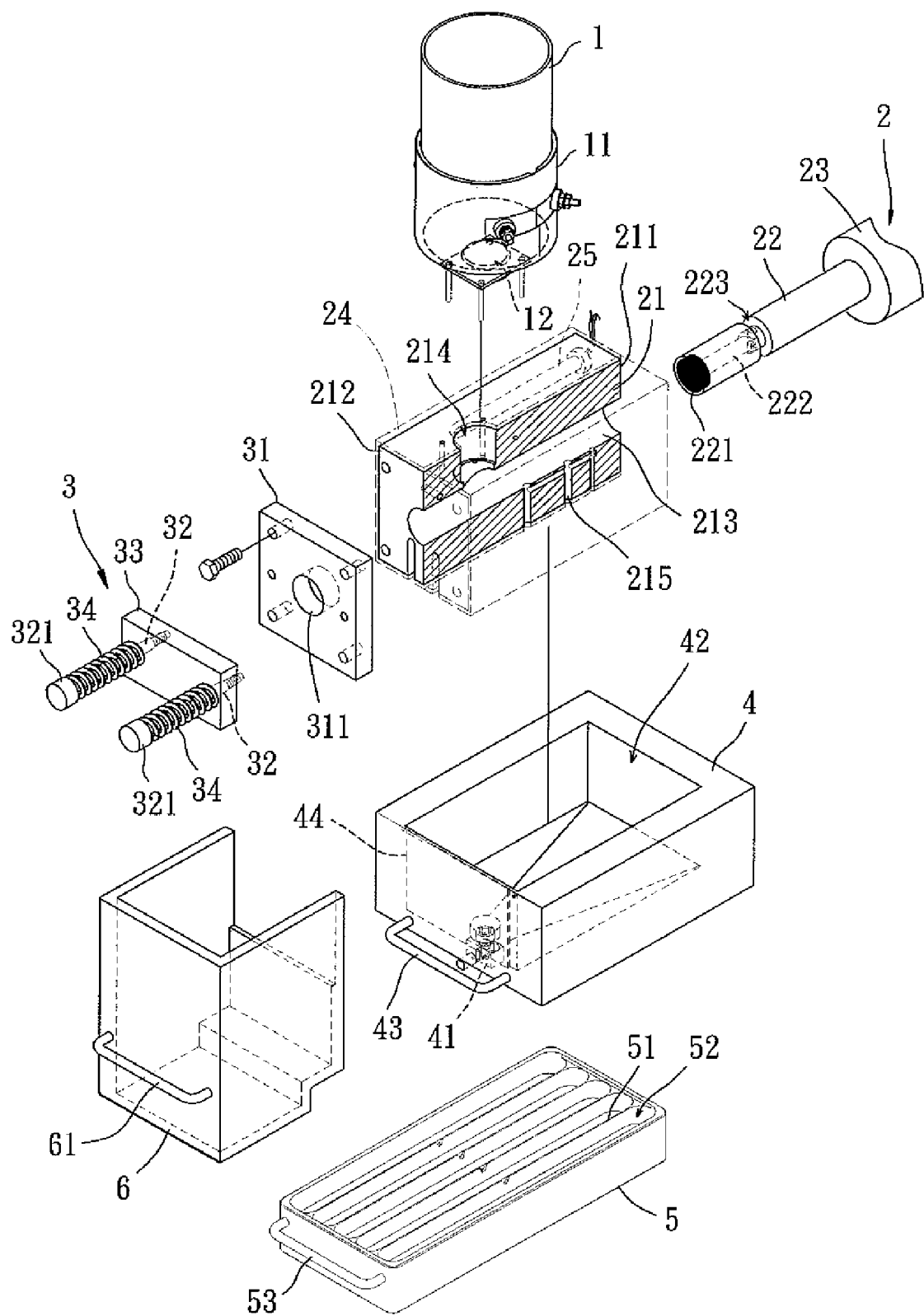
FIG. 1 is an exploded perspective view illustrating a filter in accordance with a preferred embodiment of the present invention.

In the various figures of the drawings, the same numerals designate the same or similar parts. Furthermore, when the terms "first", "second", "lower", "upper", "end" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Referring now to FIG. 1, a filter in accordance with a preferred embodiment of the present invention includes a crucible 1, a filtering container 2, an outlet valve 3, a receiving tank 4, a mold case 5 and a collecting tank 6. The crucible 1 is for receiving and heating a pre-filtered object including a primary material and other materials with melting points higher than the melting point of said primary material, and the crucible 1 provides a heating temperature higher than the melting point of the primary material but lower than those of said other materials. Therefore, the pre-filtered object is heated by the crucible 1 and transformed into two parts: primary material in liquid and other materials in solid. The filtering container 2 connects with the crucible 1 for the heated pre-filtered object to flow in, with the filtering container 2 then pressing the heated pre-filtered object to separate the primary material and other materials by a sieve 221. The outlet valve 3 is coupled at an end of the filtering container 2 for opening the filtering container 2 to release said other materials from the filtering container 2, which are separated from the primary material by the sieve 221. The receiving tank 4 receives the primary material filtered out by the filtering container 2 and guides the primary material to flow into the mold case 5 and form in a predetermined shape. The collecting tank 6 is for collecting the released other materials.

Figure 2:
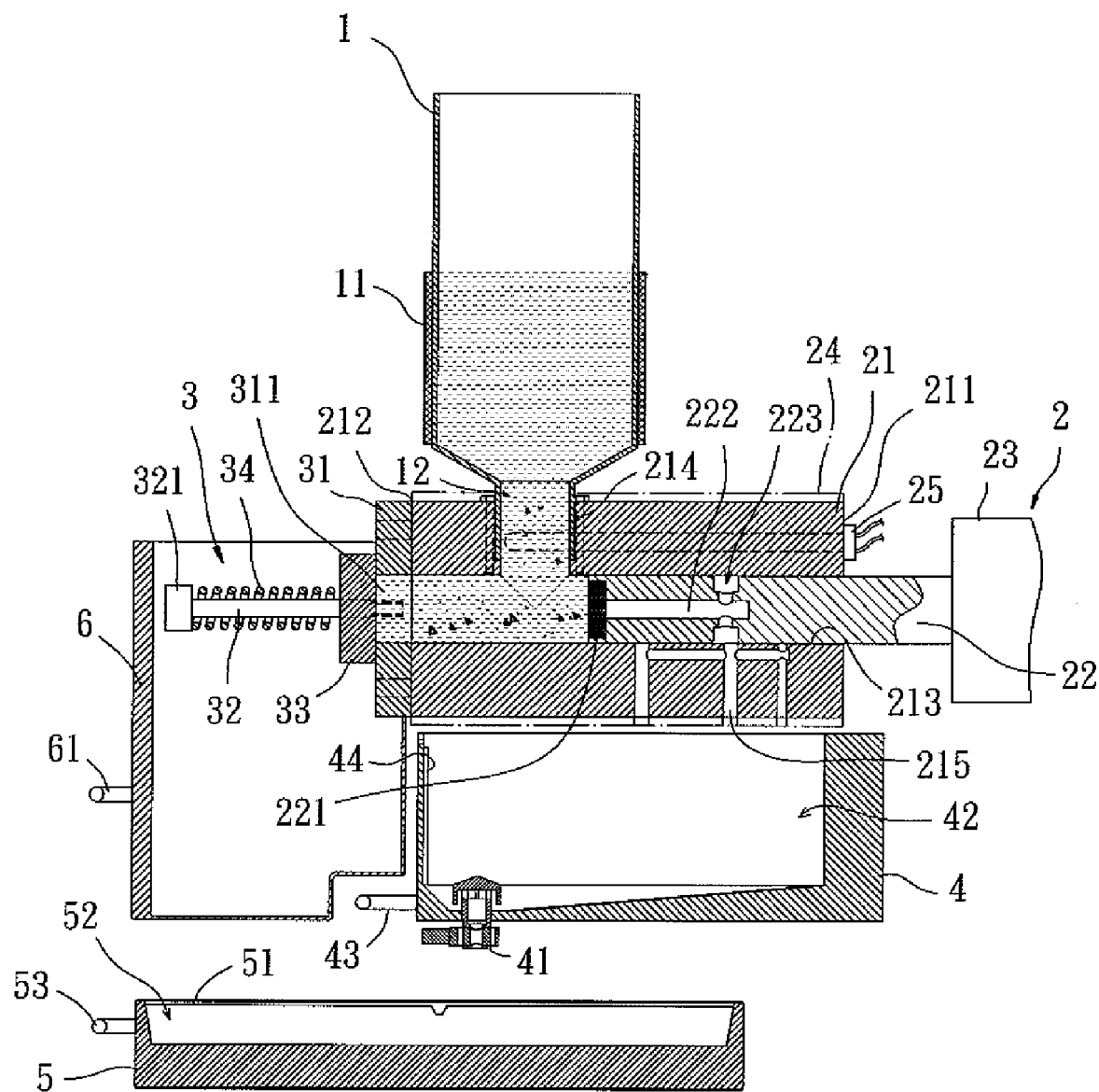
FIG. 2 is a cross-sectional side view illustrating the filter.

Referring now to FIGS. 1 and 2, the crucible 1 includes a heater 11 and an outlet 12. The heater 11 such as a cartridge heater or a heating chip is arranged at outer surface of the crucible 1, and the outlet 12 is disposed at the bottom of the crucible 1 for the heated pre-filtered object to flow out of the crucible 1.

The filtering container 2 includes a body 21, a press rod 22, and a driving member 23. The body 21 has a first end 211, a second end 212, a channel 213, a guide-in member 214, and a guide-out member 215. The first and second ends 211, 212 are formed at two opposite sides of the body 21, with the channel 213 extending from the first end 211 to the second end 212 and preferably penetrating the body 21. The guide-in member 214 is arranged at an upper part of the body 21 and connects between the outlet 12 of the crucible 1 and the channel 213 for guiding the heated pre-filtered object in. And the guide-out member 215 is arranged at a lower part of the body 21 and also connects with the channel 213 for guiding the filtered primary material out. Furthermore, a thermal insulation layer 24 covers the body 21 to maintain the temperatures of the heated pre-filtered object and the filtered primary material. Besides, a heater 25 can be arranged inside the body 21 to compensate the heated pre-filtered object and the filtered primary material for lost heat.

The press rod 22 is inserted into the channel 213 of the body 21 from the first end 211 and movably received therein, with a cross-section of the press rod 22 preferably equal to that of the channel 213 and said cross-section being perpendicular to a direction wherein the press rod 22 moves. The press rod 22 provides the sieve 221, a passageway 222, and a through hole 223. The sieve 221 forms an end of the press rod 22, faces the second end 212 of the body 21, and is always between the guide-out member 215 and second end 212 of the body 21 when the press rod 22 is moved. The passageway 222 is inside the press rod 22 and connects with the sieve 221 for the filtered primary material to pass through. The through hole 223 connects a surface of the passageway 222 and an outer surface of the press rod 22 for the passageway 222 to link to the guide-out member 215 through the through hole 223. The driving member 23 couples to an end of the press rod 22 opposite to the end where the sieve 221 forms for driving the press rod 22 to move along the channel 213 in reciprocation. And the driving member 23 is preferably selected from a cylinder such as a hydraulic cylinder or a pneumatic cylinder.

The outlet valve 3 includes a base 31, two slide shafts 32, a shutter 33 and two elastic members 34. The base 31 is firmly fixed on an outer surface of the second end 212 of the body 21, with the base 31 being fixed by screws preferably and having an opening 311 aligned with the channel 213 of the body 21. Each of the two slide shafts 32 is mounted on the base 31 with one end while a limit block 321 is formed at the other end. The shutter 33 is movably coupled with the two slide shafts 32 for sliding along said slide shafts 32, so as to conceal or reveal the opening 311. The two elastic members 34 are arranged on the two slide shafts 32 respectively, with each elastic member 34 being between the shutter 33 and the limit block 321 of each slide shaft 32. An initial state and an open state of the outlet valve 3 are therefore defined, with the shutter 33 being biased by the elastic members 34 to tightly conceal the opening 311 in the initial state and sliding along the slide shafts 32 to reveal the opening 311 in the open state. Preferably, the elastic members 34 are selected from springs and respectively wired around the slide shafts 32. Moreover, amounts of the slide shafts 32 and elastic members 34 are corresponding to each other and are flexible.

The receiving tank 4 is below the body 21 of the filtering container 2 and includes an exit valve 41 adjacent to the bottom of the filtering container 2 and an entrance 42 facing the guide-out member 215 of the body 21. The mold case 5 is below the receiving tank 4 and provides at least one partition 51 to form a plurality of compartments and an entrance 52 facing the exit valve 41 of the receiving tank 4. And the collecting tank 6 is adjacent to the second end 212 of the body 21 for collecting said other materials separated from the primary material. Furthermore, outer surfaces of the receiving tank 4, mold case 5, and collecting tank 6 can selectively and respectively provide handles 43, 53, 61, such that the receiving tank 4, mold case 5, or collecting tank 6 is able to be easily moved.

Said pre-filtered object may include several kind of materials with various melting points, such as discarded material of stannum with impurities, stannum alloy or a compound of metal and non-metal. In the following illustrative example of operation of the present invention, a discarded material of stannum with impurities is selected as the pre-filtered object.

Figure 3:
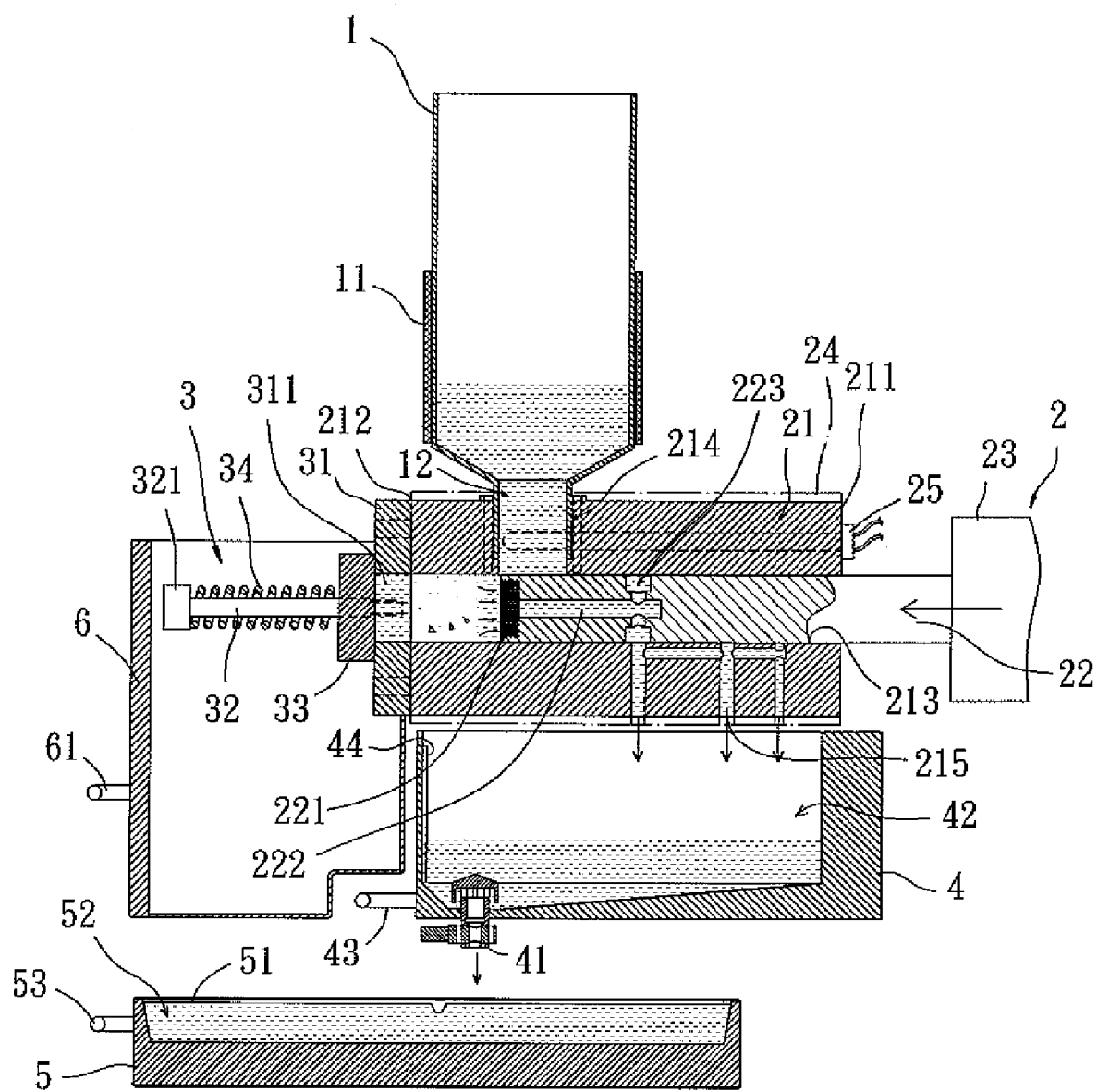
FIG. 3 is a cross-sectional side view illustrating the filter when an outlet valve is at an initial state.
Figure 4:
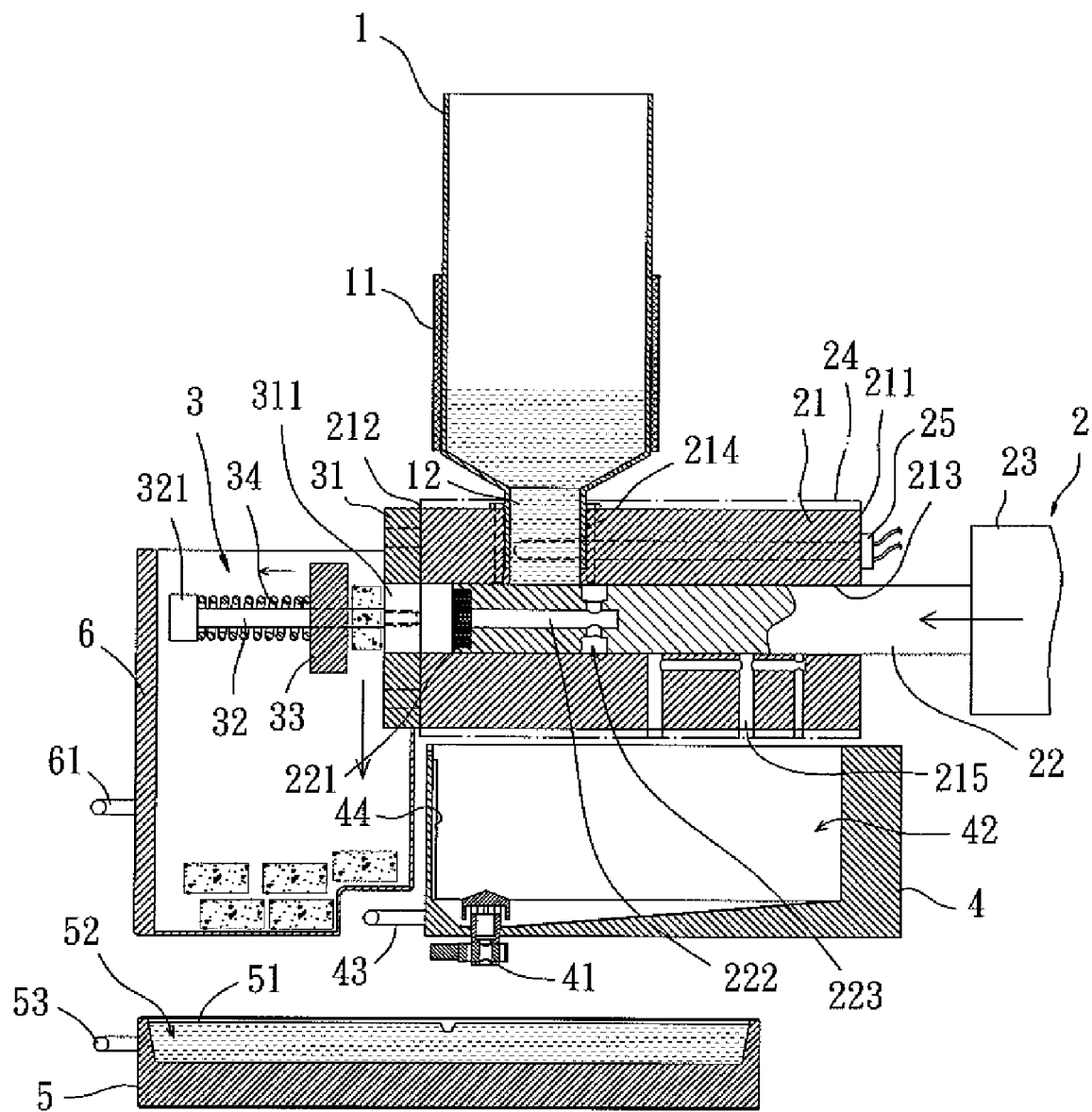
FIG. 4 is a cross-sectional side view illustrating the filter when the outlet valve is at an opening state.

Referring now to FIGS. 2 through 4, the discarded material is initially placed in the crucible 1 to be heated into a mixture of liquid stannum and solid impurities by the heater 11. And then the mixture flows from the crucible 1 to the channel 213 through the outlet 12 and guide-in member 214 in sequence. With the channel 213 receiving the mixture, the driving member 23 drives the press rod 22 moving toward the second end 212 of the body 21, so that the liquid stannum is pressed to flow through the sieve 221 and the solid impurities are filtered out. While the press rod 22 passes the whole channel 213, all the solid impurities are filtered out and piled between the sieve 221 and the shouter 33 with most of the liquid stannum flowing through the sieve 221. By pressing through the piled solid impurities and the shouter 33, the press rod 22 compresses the elastic member 34, the state of the outlet valve 3 is therefore transferred from the initial state to the open state. And thereby the solid impurities are pushed through the revealed opening 311 and falls into the collecting tank 6. Finally, when the press rod 22 is driven by the driving member 23 to move away from the shouter 33, the shouter 33 is thus back to tightly conceal the opening 311, and the state of the outlet valve 3 is returned to the initial state from the open state. Moreover, instead of the elastic member 34, the shutter 33 can also be driven to conceal the opening 311 by a cylinder, with the opening 311 being revealed when the pressing force of the press rod 22 is larger than that of the cylinder.

Regarding to the liquid stannum, after passing through the sieve 221, the liquid stannum flows into the receiving tank 4 through the passageway 222 and guide-out member 215. Besides, by control over the exit valve 41 of the receiving tank 4, the liquid stannum then flows into each compartment of the mold case 5 to solidify and shape into a plurality of stannum blocks without said impurities. Furthermore, a heater 44 may be disposed on inner surfaces of the receiving tank 4 for maintain the temperature of the liquid stannum held in the receiving tank 4, so as to prevent the liquid stannum from solidifying in the receiving tank 4.

As has been discussed above, the present invention can actually provide a high-speeded filtering process and a large output ratio with the filtering container 2 pressing the liquid primary material passing through the sieve 221 to filter out said other materials. Besides, by controlling the state of the outlet valve 3 to collect said other material in the collecting tank 6 and directly shaping the primary material into a predetermined shape by the mold case 5, said high-speeded filtering process can be performed automatically and conveniently.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A filter, comprising:
   a crucible having a heater for heating a pre-filtered object to comprise a primary material in liquid and at least one other material in solid;
   a filtering container having a body connecting with the crucible for receiving the heated pre-filtered object in a channel and providing a guide-out member, a sieve disposed in the channel and a press rod movably received in the channel for pressing the primary material of the pre-filtered object to flow through the sieve and to the guide-out member; and
   a receiving tank having an entrance facing the guide-out member of the filtering container to receive the filtered primary material,
   wherein the sieve forms an end of the press rod and the press rod has a passageway connecting with the sieve and linking to the guide-out member,
   wherein the channel penetrates the body, with one end of the channel being coupled with an outlet valve and the other end of the channel being for the press rod to be inserted into,
   wherein the outlet valve has a base fixing on the filtering container and having an opening align with the channel, a slide shaft being mounted on the base, and a shutter movably coupled with the slide shafts for sliding along said slide shafts to conceal or reveal the opening.

2. The filter as defined in claim 1, wherein the body further has a guide-in member linking with the channel for the primary material from the crucible to pass through while the guide-out member also links with the channel.

3. The filter as defined in claim 2, wherein the guide-in member is arranged at an upper part of the body and the guide-out member is arranged at a lower part of the body.

4. The filter as defined in claim 1, wherein the filtering container further has a driving member coupling to an end of the press rod opposite to the end where the sieve forms for driving the press rod to move along the channel in reciprocation.

5. The filter as defined in claim 1, wherein the slide shaft is mounted on the base with one end and has a limit block at the other end, with the outlet valve further having an elastic member between the shutter and the limit block.

6. The filter as defined in claim 1 further comprising a collecting tank adjacent to the body for collecting said at least one other material.

7. The filter as defined in claim 1, wherein the receiving tank has an exit valve for the primary material to flow out of the receiving tank.

8. The filter as defined in claim 7 further comprising a mold case providing an entrance facing the exit valve of the receiving tank for receiving the primary material flowing out of the receiving tank.

* * * * *